Patented Mar. 28, 1939

2,152,519

UNITED STATES PATENT OFFICE 2,152,519

DIANTHRAPYRIDONES

Rudolf Lesser, Berlin, Germany, assignor to General Aniline Works, Inc., New York, N. Y., a corporation of Delaware No Drawing. Application November 16, 1937, Serial No. 174,822. In Germany November 24, 1936

2 Claims. (Cl. 260—278)

My present invention relates to new compounds of the anthracene series and more particularly to dianthrapyridones which correspond to the general formula

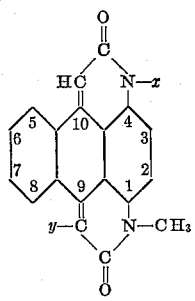

in which $x$ means an aryl radicle of the benzene, biphenyl and naphthalene series and $y$ is either hydrogen or a radicle of the benzene series.

A further object of my invention is a process for producing the said compounds.

My invention is based on the observation that 4-para-toluidino-1.9-N-methyl-anthrapyridone can be acetylated with acetic anhydride in presence of a catalyst such as zinc chloride or concentrated sulfuric acid, and that the acetyl compound thus obtained is transformed into the hitherto unknown 1.9-N-methyl-4.10-N-paratolyl-dianthrapyridone when it is suspended in a suitable organic solvent and warmed with diluted alcoholic alkali lye or with a solution of an alkali metal alcoholate, this reaction following the scheme:

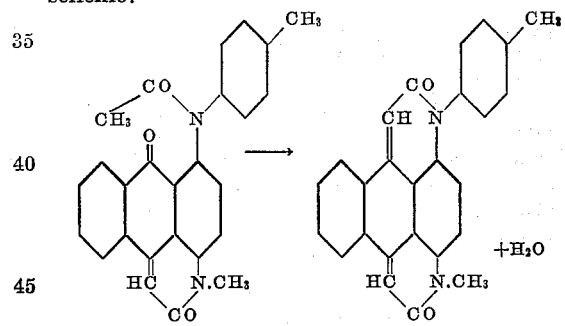

This new reaction is not limited to this equation and instead of the anthrapyridone mentioned above, not only generally 4-arylamino-1.9-N-methyl-anthrapyridones may be used as starting materials, but likewise those anthrapyridones which are known from German Patent No. 633,308 and German Patent No. 658,114 and formed by condensing with arylamines 4-bromo- or chloro-1.9-C-phenyl-N-methyl-anthrapyridones or the corresponding derivatives substituted in the phenyl radicle.

As organic solvents in which the ring closure under formation of the second anthrapyridone nucleus is performed by treatment with an alcoholic alkali hydroxide solution or a solution of an alkali metal alcoholate, such liquids are useful which do not react per se with the said alkalies and the boiling points of which are higher than the temperature required for ring closure. I enumerate, for instance, hydrocarbons, monohydric or polyhydric alcohols, ketones, ethers, as well of the aliphatic as of the aromatic or hydroaromatic series. The action of the alcoholic alkalies preferably is carried out at a temperature of about 60 to 120° C. and is easily maintained by the choice of a suitable organic liquid of the classes mentioned above. The amount of the alkaline agent is thus chosen that the total volume of the liquid contains about 1 to 2 per cent. of alkali metal hydroxide or alkali metal respectively. The yields obtainable as well of the 4-acetylarylamino-anthrapyridone as of the dianthrapyridone, are nearly quantitative. The new products thus obtained are crystallized orange red to brown red colored compounds of high melting point and apt to manifold reactions although they possess a good stability. They may be, for instance, halogenated or nitrated to form valuable intermediate products for the manufacture of dyes.

The examples following hereafter serve to illustrate my invention, the parts being by weight:—

*Example 1.*—3 parts of 4-para-toluidino-1.9-N-methyl-anthrapyridone are mixed with 10 parts of acetic anhydride and boiled, while stirring, under reflux on the oil bath after addition of a small amount of molten zinc chloride. The violet magma of crystals while being partly or completely dissolved, is rapidly transformed into microscopic small needles. After boiling for a short time the liquid has become yellow brown and is cooled. The precipitate is filtered by suction, washed with glacial acetic acid and water and then dried. The yield is about 3 parts. Recrystallized from acetic anhydride yellow needles are obtained melting at 257 to 258°.

10 parts of this acetyl compound are added in a finely pulverized state to a solution comprising 40 parts of ethyl alcohol and such an amount of a concentrated alcoholic caustic potash or sodium hydroxide solution that a solution containing 1.5 per cent. alkali is formed. This mixture is boiled, while stirring, under reflux. Without forming a solution the powdery acetyl compound yields a stiff magma of orange red to brown red needles of the dipyridone. After boiling for a short time the reaction is complete. Alcohol is added and the reaction product is separated by filtration, washed with alcohol or water and then dried. The yield is about 9.6 parts. The compound is relatively easily soluble in glacial acetic acid, easily soluble in dichlorobenzene. Recrystallized from glacial acetic acid it forms orange red needles melting at a temperature higher than 320°. The compound dissolves in concentrated sulfuric acid forming a red solution from which yellow flakes of the unaltered dipyridone are separated when diluted with water.

Example 2.—4-para-toluidino-1.9-C-phenyl-N-methyl-anthrapyridone obtained by melting together 4-bromo-1.9-C-phenyl-N-methyl-anthrapyridone with para-toluidine, are boiled as indicated in Example 1 with acetic anhydride under addition of a small amount of concentrated sulfuric acid. The acetyl compound is thus obtained in form of orange yellow lustrous tablets or needles which recrystallized from acetic anhydride, melt at 271 to 272°. The ring closure under formation of the dipyridone is performed as easily as indicated in Example 1 by condensation of a suspension in the three- to fourfold amount of toluene with such a quantity of methyl alcoholic potash lye that the total volume of the liquid contains about 1.5 per cent. of potassium hydroxide. The dianthrapyridone forms orange red needles with silky luster which dissolve easily in hot chloro- or dichlorobenzene, more difficult in xylene, and which melt at a temperature higher than 320°. In concentrated sulfuric acid the dipyridone forms a red solution from which yellow flakes are separated by dilution with water. Instead of carrying out the ring closure of the starting material while suspended in toluene, with the same effect dioxane, methylethylketone, 1.3-butylene glycol, $\beta,\beta'$-dihydroxydiethylether, cyclopentanol, cyclohexanone, methylcyclohexane and dibenzylether may be used as suspending agent. The reaction occurs with the liquids having a lower boiling point at the boiling point, otherwise the mixture is heated to about 110 to 120° C.

Example 3.—In the same manner the 4-para-diphenyl-amino-1.9 - N - methyl - anthrapyridone (brown violet lustrous needles obtained by condensing 4-bromo-1.9-N-methyl-anthrapyridone and para-aminodiphenyl) yields with acetic anhydride and concentrated sulfuric acid in catalytic quantities the corresponding acetyl compound. Recrystallized from acetic anhydride it forms orange red tablets melting at 279 to 280° while becoming dark colored.

3 parts of the finely pulverized acetyl compound are boiled under reflux with 12 parts of n-butyl alcohol containing alkali corresponding to 1.5 per cent. of metallic sodium, until a unitary magma of crystals of brownish tablets of the dianthrapyridone has been formed. After cooling the reaction product is filtered by suction, washed with methanol, and dried. It forms yellow brown needles with a melting point higher than 320° which are relatively easily soluble in dichlorobenzene from which it crystallizes in form of long yellow red needles. In concentrated sulfuric acid the dianthrapyridone dissolves to a weakly violet solution from which it is separated by water under formation of yellow brown flakes.

Example 4.—From the 4-para-anisidino-1.9-C-para-nitrophenyl-N-methyl-anthrapyridone, obtained from 4-bromo-1.9-C-para-nitrophenyl-N-methyl-anthrapyridone and para-anisidine under addition of anhydrous sodium acetate and forming violet red lustrous needles, the acetyl compound is prepared in the same manner as indicated in Examples 1 and 2. Recrystallized from acetic anhydride it forms orange yellow needles melting at 274 to 275°. The ring closure may be performed, for instance, in this case in a suspension of 3 to 4 parts of benzyl alcohol with such an amount of methyl alcoholic potash lye that the total volume of the liquid contains about 1.5 per cent. of potassium hydroxide. After warming for a short time to about 110 to 120° the mixture solidifies to a magma of brownish microscopical needles which after cooling and dilution with methanol are filtered with suction, washed with methanol and hot water and finally dried. They melt at a temperature higher than 320° C. and are difficultly soluble in the usual organic solvents. They dissolve in concentrated sulfuric acid with yellow red to brown red color, by addition of water yellow flakes are separated from this solution.

Example 5.—4-α-naphthylamino-1.9-C-phenyl-N-methyl-anthrapyridone is obtained by melting together 4-bromo-1.9-C-phenyl - N - methyl-anthrapyridone with 1-naphthylamine under addition of anhydrous sodium acetate. From this melt it is separated by addition of methanol under formation of violet needles. The said anthrapyridone is transformed as indicated in the foregoing examples, into the corresponding acetyl compound and then into the 1.9-C-phenyl-N-methyl - 4.10 - N - α - naphthyldianthrapyridone. The acetyl compound recrystallized from acetic anhydride forms brown red lustrous tablets which melt at 286° while becoming dark colored. The dianthrapyridone forms brownish needles or small rods which have a melting point higher than 320° C. and are easily soluble in hot chlorobenzene and dichlorobenzene. The solution in concentrated sulfuric acid is green brown, by addition of water yellow brown flakes are separated.

What I claim is:—

1. The dianthrapyridones corresponding to the general formula

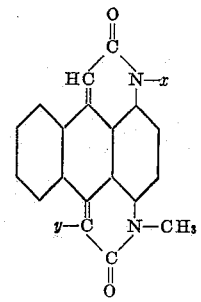

wherein $x$ is a member of the group consisting of phenyl, alkylphenyl, alkoxyphenyl, biphenyl and naphthyl and $y$ is a member of the group consisting of hydrogen, phenyl and nitrophenyl, said products being crystallized orange red to brown red colored compounds of high melting point.

2. The process which comprises acetylating a 4-arylamino-1.9-N-methyl-anthrapyridone of the general formula

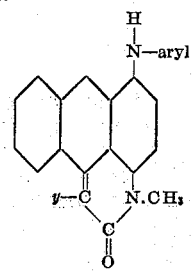

in which $y$ means a member of the group consisting of hydrogen and radicles of the benzene series, and heating the acetyl compound suspended in an organic solvent in presence of an alkali.

RUDOLF LESSER.